Dec. 27, 1949 F. S. BRACKETT 2,492,353
DUAL PERISCOPIC SIGHT
Filed June 11, 1946 2 Sheets-Sheet 1
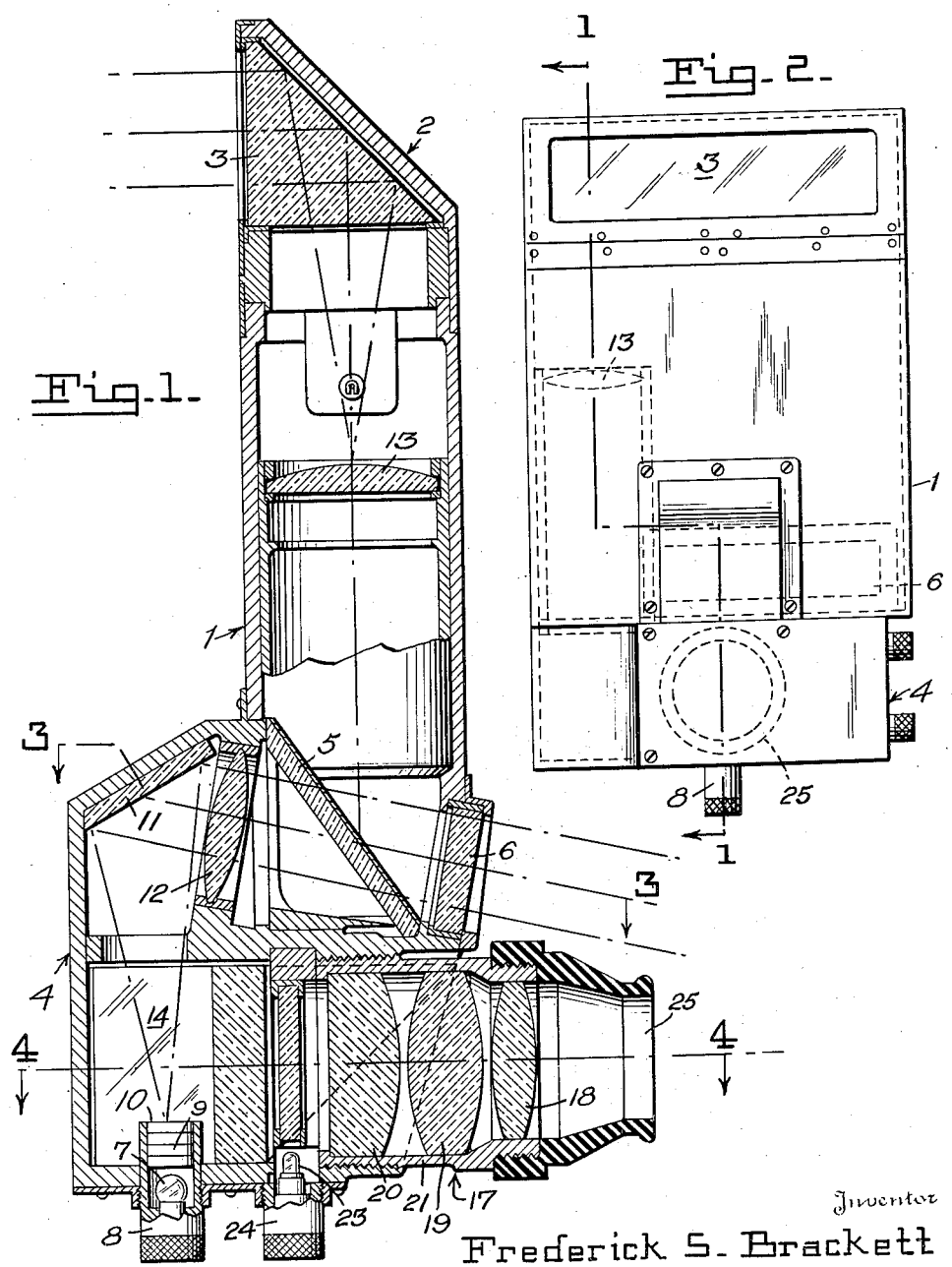
Inventor
Frederick S. Brackett
By J. H. Church + W. E. Thibodeau
Attorney Dec. 27, 1949     F. S. BRACKETT     2,492,353
DUAL PERISCOPIC SIGHT
Filed June 11, 1946     2 Sheets-Sheet 2
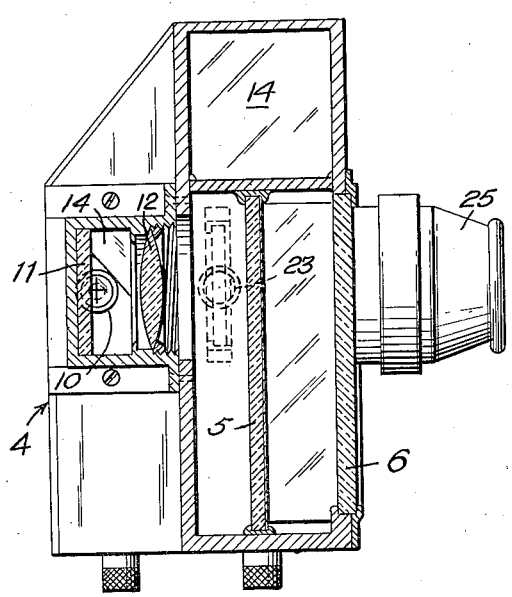
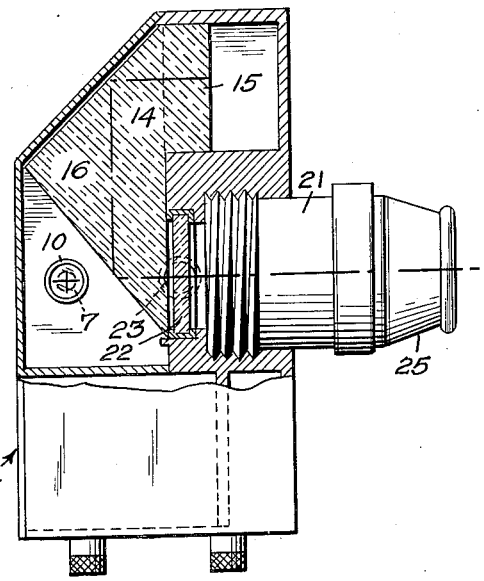
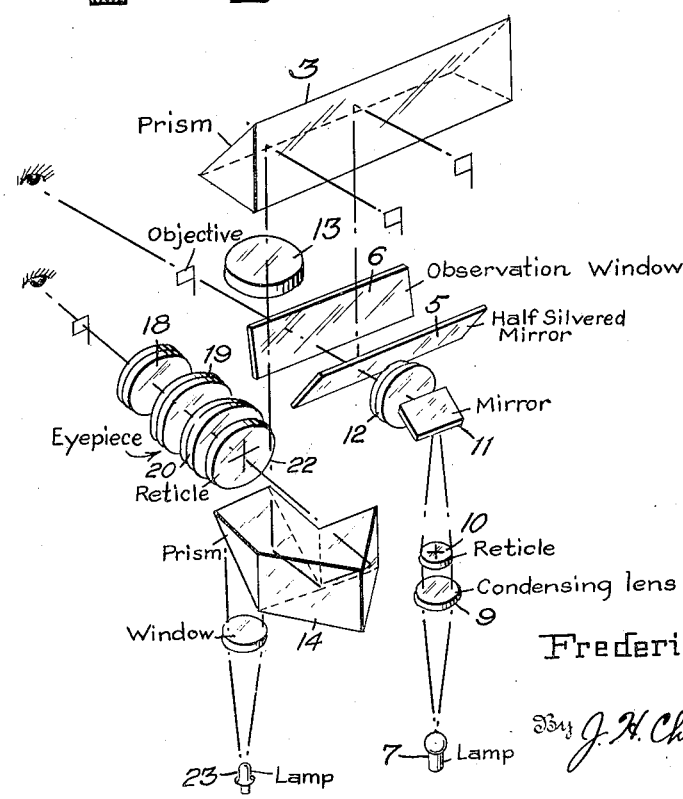
Inventor
Frederick S. Brackett
By J. H. Church & W. E. Thibodeau
Attorney Patented Dec. 27, 1949

2,492,353

UNITED STATES PATENT OFFICE 2,492,353

DUAL PERISCOPIC SIGHT

Frederick S. Brackett, Chevy Chase, Md., assignor to the United States of America as represented by the Secretary of War Application June 11, 1946, Serial No. 676,054

5 Claims. (Cl. 88—72)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to optical instruments and, more particularly, to periscopes providing a dual sight of high and unit power. The invention is particularly applicable to periscopes of the type utilized in combat vehicles such as tanks.

Heretofore, periscopic sighting devices have generally been constructed to provide a single optical train of either unit or higher power. In some instances, unit power periscopes have been modified by inserting a standard telescope at one side between the head and elbow as shown, for example, in the patent to Crawford, No. 2,307,759, issued January 12, 1943. This introduces many unnecessary surfaces causing loss of transmission, flare, veiling haze, etc., and the ocular of the telescope is so far removed from the eye that a poor field is inevitable. Also, the diameter of the telescope is necessarily so small as to further reduce the field. Many of these disadvantages were overcome by mounting a positive or converging lens within the periscope near the upper window and a negative or diverging lens outside the lower window as shown in the patent to Swift No. 2,392,428, issued January 8, 1946. The resultant Galilean telescopic system, however, is disadvantageous for fire-control purposes as it cannot be fitted with a reticle. A further disadvantage of both modifications discussed above is that the user is required to change body position in order to effectively transfer from one sight to the other.

An object of the present invention is to provide a periscope having high and unit power optical trains built into a single unitary instrument.

A further object of the present invention is to provide a periscope having high and unit power optical trains which are constructed in an overlapping and cooperating manner thereby providing a maximum of utility in a compact instrument.

Another object of the invention is to provide a periscope having high and unit power optical trains in which each optical train may be provided with a reticle.

Another object of the invention is to provide a periscope having high and unit power optical trains so constructed that the user may observe through one train or the other without changing body position.

The accomplishment of the foregoing and other objects of the invention will become apparent from the following description of a specific embodiment of the invention shown in the accompanying drawings in which:

Fig. 1 is a vertical cross-sectional view of the assembled device taken along lines 1—1 of Fig. 2;

Fig. 2 is a front view of the device;

Fig. 3 is a plan view of the device partially in cross-section along the line 3—3 of Fig. 1;

Fig. 4 is a plan view of the device partially in cross-section along the line 4—4 of Fig. 1 and Fig. 5 is a diagrammatic view of the high and unit power optical trains of the device.

Referring to the drawings, the embodiment of the invention is shown in a periscope designed for military use. It comprises a body 1 and a detachable head 2 mounted at the upper end containing an elongated right-angle prism 3. The major items of the two optical trains are housed in the elbow 4 of the periscope.

The unit power optical train comprises an elongated half-silvered partially reflecting, partially transmitting mirror 5 which is mounted in the upper part of the elbow 4. The mirror 5 is disposed at an angle such that the light coming from the prism 3 is reflected rearwardly and slightly downwardly (preferably at about 15° from the horizontal). A window 6 is provided through which the light rays are reflected from the mirror 5 into the eye of the observer.

Forwardly of and below the mirror 5 there is disposed an assembly of elements for reflecting a reticle pattern on the forward surface of the mirror 5. This assembly comprises a lamp 7 and lamp housing 8 fitted with a condensing lens 9 and reticle 10 which is mounted at the bottom of the periscope. The light rays from the lamp 7 pass through the reticle 10 and are reflected by a mirror 11 through a collimating lens 12 onto the front of the mirror 5. The mirror 5 is designed to permit medium rays of light to pass through it while reflecting the rays from the prism 3. This causes the reticle pattern to appear as if superimposed on the target at a distance. In the specific embodiment, the reticle reflecting assembly is disposed adjacent the front and intermediate the sides of the periscope.

The high power sighting train of the periscope is preferably of the order of 6 power. It comprises an objective lens 13 mounted, preferably adjustably, in the body 1 of the periscope beneath and adjacent the right angle prism 3. In cross-section, the objective 13 and mirror 5 appear to be in side-by-side relationship. In the specific embodiment shown in the drawings, the mirror 5 extends laterally from one edge for a distance of about two-thirds of the width of the periscope while the objective is disposed in the remaining one third of the width of the periscope.

The remainder of the high power sighting train is housed in the lower part of the elbow 4. In the path of the rays transmitted downwardly from the objective 13 is a prism 14 which may be regarded as a combination of a right angle prism 15 and a porro prism 16. It will be apparent that the prism 14 in combination with the head prism 3 forms a porro prism erecting system. At the same time the light rays are reflected so that the line of sight is rearward and at a right angle to the axis of the periscope. Also, the light rays are reflected inwardly away from the side of the periscope so that the line of sight is intermediate the sides of the periscope. As a result the line of sight is beneath the inner portion of window 6 through which may be seen the reticle pattern of the unit power train referred to above.

Disposed in the line of sight to the rear of prism 14 is a conventional eyepiece 17 comprising an eyelens 18 and lenses 19 and 20 mounted in a cell 21. A conventional eyeshield 25 is mounted on the end of the eyepiece 17. The eyepiece 17 preferably is adjustably mounted in the elbow 4. In front of the eyepiece 17 there is mounted a reticle 22 which may be illuminated, if desired, by a lamp 23 mounted in a housing 24 disposed below the reticle.

In the light of the above disclosure, it will be seen that a novel periscope of wide usefulness has been provided. The one power optical system provides a means of observing a large field of view of the order of forty-five degrees in the horizontal direction and ten degrees in the vertical direction. The high power system is available for searching distant and or carefully concealed targets and for night use. The systems are built into the body of the periscope instead of being incorporated in separate instruments. Among the useful results of this novel combination is an over-lapping of elements so that the user may shift from one optical system to the other merely by tilting his head 15 degrees.

It will be apparent that the specific embodiment of the invention described above may be subject to many modifications within the scope of the invention, and all such modifications are intended to be included within the scope of the following claims.

I claim:

1. A periscope having unit and high power optical trains comprising an upright body having side walls, an elongated right angle entrance prism mounted at the top and extending between the side walls of said body for reflecting light rays from the front of the periscope downwardly through said body, an elongated window at the bottom and rear of said body, an elongated partially-reflecting mirror mounted at the bottom of said body and extending part way across said body from one side wall thereof to reflect light rays from a first portion of right angle prism rearwardly of the body through said window, said mirror terminating in spaced relation with the other side wall of the body to provide an optical passageway therebetween, means comprising a source of light, a reticle and a reflecting surface for projecting a reticle pattern on the forward surface of said mirror, an objective lens mounted in said body below a second portion of said entrance prism and above the said optical passageway, a right angle prism mounted in said body below the said optical passageway to reflect light rays from said objective lens forwardly of the periscope, a porro prism mounted in cooperating relationship with the last named right angle prism to reflect the light rays laterally inwardly of the periscope and rearwardly therefrom to form a field of view immediately beneath the reticle pattern on the mirror, a reticle mounted in said field of view, and an adjustable eyepiece for receiving light from said porro prism through said reticle.

2. A dual power periscope having unit and high power optical trains comprising an upright body having side walls, an elongated right angle objective prism mounted at the top and extending between the side walls of said body for reflecting light rays from the front of the periscope downwardly through said body, an elongated window at the bottom and rear of said body, an elongated partially-reflecting mirror mounted at the bottom of said body and extending part way across said body from one side wall thereof to reflect light rays from a first portion of the right angle prism rearwardly of the body and downwardly at a small angle of the order of 15 degrees through said window, said mirror being spaced from the other side wall of the body to provide an optical passageway therebetween, means comprising a source of light, a reticle and a reflecting surface for projecting a reticle pattern on the forward surface of said mirror adjacent said optical passageway, an objective lens mounted in said body below the objective prism and above the said optical passageway, a right angle prism mounted below the said optical passageway to reflect light rays from the objective lens forwardly of the periscope, a porro prism mounted in cooperating relationship with the last named right angle prism to reflect the light rays laterally inwardly of the periscope and rearwardly therefrom to form a line of sight immediately beneath the reticle pattern on the mirror, a reticle mounted in said line of sight, means for illuminating said reticle, and an adjustable eyepiece carried by said body in said line of sight for receiving light from said porro prism and said reticle whereby unit and high power observation of the same field of view is afforded from substantially the same eye position.

3. In a dual power periscope, an inclosed upright body including front, side and rear walls, there being a viewing window in the lower portion of said rear wall, an elongated right angle entrance prism mounted in an opening in the top of said front wall and extending between said side walls for reflecting rays from a remote field of view downwardly through said body, an elongated lower reflector mounted in the lower portion of said body and extending across said body from one side wall thereof a distance less than the length of said entrance prism, to reflect rays from a first portion of said entrance prism rearwardly through said window, said reflector being spaced from the other side wall of said body to provide a passageway therebetween, an objective mounted within said passageway below said entrance prism and in the path of rays reflected by a second portion thereof, a second right angle prism in said body below said objective to receive rays therefrom, a porro prism mounted in said body forwardly of said second prism to reflect rays from said objective horizontally inwardly and rearwardly, and an eyepiece carried by said body in position contiguous to and closely beneath said window for receiving rays from said porro prism, whereby an observer may see an unmagnified field of view from the lower reflector and a magnified portion of the field of view in the eyepiece, without movement of his head.

4. In a dual power periscope, an upright casing comprising front, rear, and side walls, there being a viewing window in the lower portion of said rear wall, a first elongated right angle entrance prism mounted in an opening in the upper front wall of said casing to reflect rays from a remote field of view downwardly through said casing, an elongated partially reflecting mirror mounted in the lower portion of said casing and extending part way across said casing from one side wall thereof to reflect rays from a first portion only of said entrance prism in a rearwardly and downwardly inclined direction through said window, said mirror being spaced from the other side wall of said casing to provide a passageway, means within said casing for projecting a reticle pattern on the forward surface of said mirror, an objective mounted in said passageway below a second portion of said entrance prism, a second right angle prism in said casing below said objective to reflect rays therefrom forwardly, a porro prism mounted in cooperating relation with said second prism to reflect rays therefrom laterally inwardly, then rearwardly, an eyepiece mounted in the lower portion of said rear wall immediately below and contiguous to said window to receive rays from said porro prism, and a reticle in said casing at the focus of said eyepiece, whereby an observer, without movement of his head, may see an unmagnified field of view in said window or a magnified portion of said field of view.

5. In a dual power periscope, an inclosed upright casing including front, side, and rear walls, there being a viewing window in the lower portion of said rear wall, an elongated right angle entrance prism mounted in an opening in the top of said front wall and extending between said side walls to reflect rays from a remote field of view downwardly through said casing, an elongated lower reflector mounted in the lower portion of said casing and extending across said casing from one side wall thereof a distance less than the length of said entrance prism, said lower reflector being disposed to reflect rays from a first portion of said entrance prism rearwardly and downwardly through said viewing window at an angle of the order of 15° to the horizontal, said lower reflector being spaced from the other side wall of said casing to provide a passageway, an objective mounted within said passageway below said entrance prism and in the path of rays reflected by a second portion thereof, an eyepiece mounted in said rear wall directly beneath and contiguous to said viewing window and with its principal axis substantially horizontal and intersecting rays from said window rearwardly of the casing, a second right angle prism and a porro prism in said casing below said objective to reflect rays therefrom in succession, forwardly, laterally and rearwardly into said eyepiece, whereby an observer may see an unmagnified field of view from the lower reflector and a magnified portion of the field of view in the eyepiece from a single viewing position of his head.

FREDERICK S. BRACKETT.

REFERENCES CITED

The following references are of record in the file of this patent:

UNITED STATES PATENTS

| Number | Name | Date |
| --- | --- | --- |
| 1,563,373 | Kauch | Dec. 1, 1925 |
| 1,913,973 | Clementi et al. | June 13, 1933 |
| 2,307,759 | Crawford | Jan. 12, 1943 |
| 2,364,670 | Stamy | Dec. 12, 1944 |
| 2,382,631 | Harasta | Aug. 14, 1945 |

FOREIGN PATENTS

| Number | Country | Date |
| --- | --- | --- |
| 362,153 | Italy | Aug. 16, 1938 |